(12) United States Patent
Tokunou et al.

(10) Patent No.: US 7,095,196 B2
(45) Date of Patent: Aug. 22, 2006

(54) VEHICLE DRIVE FORCE CONTROL APPARATUS

(75) Inventors: Hidemichi Tokunou, Hadano (JP); Satoru Chuujou, Sagamihara (JP); Yasuo Matsunaga, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 52 days.

(21) Appl. No.: 10/960,690

(22) Filed: Oct. 8, 2004

(65) Prior Publication Data
US 2005/0093496 A1    May 5, 2005

(30) Foreign Application Priority Data
Oct. 29, 2003   (JP)   ............... 2003-369452

(51) Int. Cl.
*H02P 3/12* (2006.01)
(52) U.S. Cl. ............... 318/375; 318/362; 318/366; 318/369
(58) Field of Classification Search ............... 318/375, 318/362, 366, 369, 86, 757, 273, 3, 1, 15; 475/8; 180/65.2
See application file for complete search history.

(56) References Cited
U.S. PATENT DOCUMENTS
5,713,425 A * 2/1998 Buschhaus et al. ......... 180/65.2

2004/0162187 A1 * 8/2004 Suzuki ................. 477/182
2004/0176203 A1 * 9/2004 Supina et al. ............ 475/8

FOREIGN PATENT DOCUMENTS

| | | |
|---|---|---|
| EP | 1142743 A2 | 10/2001 |
| EP | 1148275 A1 | 10/2001 |
| EP | 1291220 A1 | 3/2003 |
| EP | 1326083 A1 | 7/2003 |
| JP | 10-213158 A | 8/1998 |
| JP | 2001-253256 A | 9/2001 |
| JP | 2003-111205 A | 4/2003 |

* cited by examiner

Primary Examiner—Karen Masih (57) ABSTRACT

A vehicle driving force control apparatus is configured to prevent co-rotation of the motor caused by rotation of a pair of wheels when a clutch connecting the wheels and the motor is released (disconnected). When the clutch is released, the motor is braked by short circuiting the armature. The motor is then braked again by setting the field current of the motor to 0 when the rotational speed of the motor reaches 0. After the clutch is released, a braking-direction field current is applied to the motor in accordance with the decreasing rotational speed of the motor such that the braking force is decreased as the rotational speed of the motor decreases.

12 Claims, 9 Drawing Sheets

VEHICLE DRIVE FORCE CONTROL APPARATUS

BACKGROUND OF THE INVENTION

1. Field of the Invention

The present invention generally relates to a vehicle drive force control apparatus in which either the front wheels or the rear wheels are driven by an engine and the subordinate drive wheels can be connected to and driven by an electric motor. More specifically, the present invention is well-suited to a four-wheel drive vehicle having main drive wheels that are driven by an engine and subordinate drive wheels that can be braked and driven by an electric motor.

2. Background Information

One example of a so-called motor-driven four-wheel drive vehicle in which the front wheels (hereinafter also called "main drive wheels") are driven by an engine and the rear wheels (hereinafter also called "subordinate drive wheels") are driven by an electric motor in an auxiliary manner is disclosed in Japanese Laid-Open Patent Publication No. 2001-253256. The vehicle disclosed in that publication is designed such that a clutch (connecting device) installed between the rear wheels and the electric motor is released when the traveling speed of the vehicle reaches or exceeds a prescribed value, thereby preventing the electric motor from rotating at a speed exceeding its maximum tolerable rotational speed.

In view of the above, it will be apparent to those skilled in the art from this disclosure that there exists a need for an improved vehicle drive force control apparatus. This invention addresses this need in the art as well as other needs, which will become apparent to those skilled in the art from this disclosure.

SUMMARY OF THE INVENTION

It has been discovered that if, for example, the clutch between the electric motor and the subordinate drive wheels is a wet friction clutch that is released during acceleration of the vehicle, the viscosity of the operating fluid filling the clutch will cause the electric motor to co-rotate and the rotational speed of the electric motor to increase. In general, the viscosity of the operating fluid increases as the temperature decreases, and thus, the problem of co-rotation becomes more prominent as the temperature of the operating fluid decreases. In a situation where the rotational speed of the electric motor will increase due to co-rotation after the clutch is released, the clutch must be released when the rotational speed of the electric motor is lower than the maximum tolerable rotational speed of the electric motor. Consequently, vehicle traveling speed region in which four-wheel drive can be used is narrowed.

The present invention was developed in order to resolve these problems. One object of the present invention is to provide a four-wheel drive vehicle that can enlarge the traveling speed region in which four-wheel drive can be used by preventing co-rotation of the electric motor.

In view of the foregoing, a vehicle drive force control apparatus is provided that basically comprising a main drive source, an electric motor, a connecting device and a braking device. The main drive source is configured and arranged to drive a main drive wheel. The electric motor is configured and arranged to drive a subordinate drive wheel. The subordinate drive wheel is configured and arranged to be driven by the electric motor. The connecting device is installed in a torque transfer path between the electric motor and the subordinate drive wheel. The connecting device is configured and arranged to selectively connect and disconnect the electric motor to and from the subordinate drive wheel. The braking device is arranged and configured to brake the electric motor immediately after the electric motor is disconnected from the subordinate drive wheel by the connecting device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
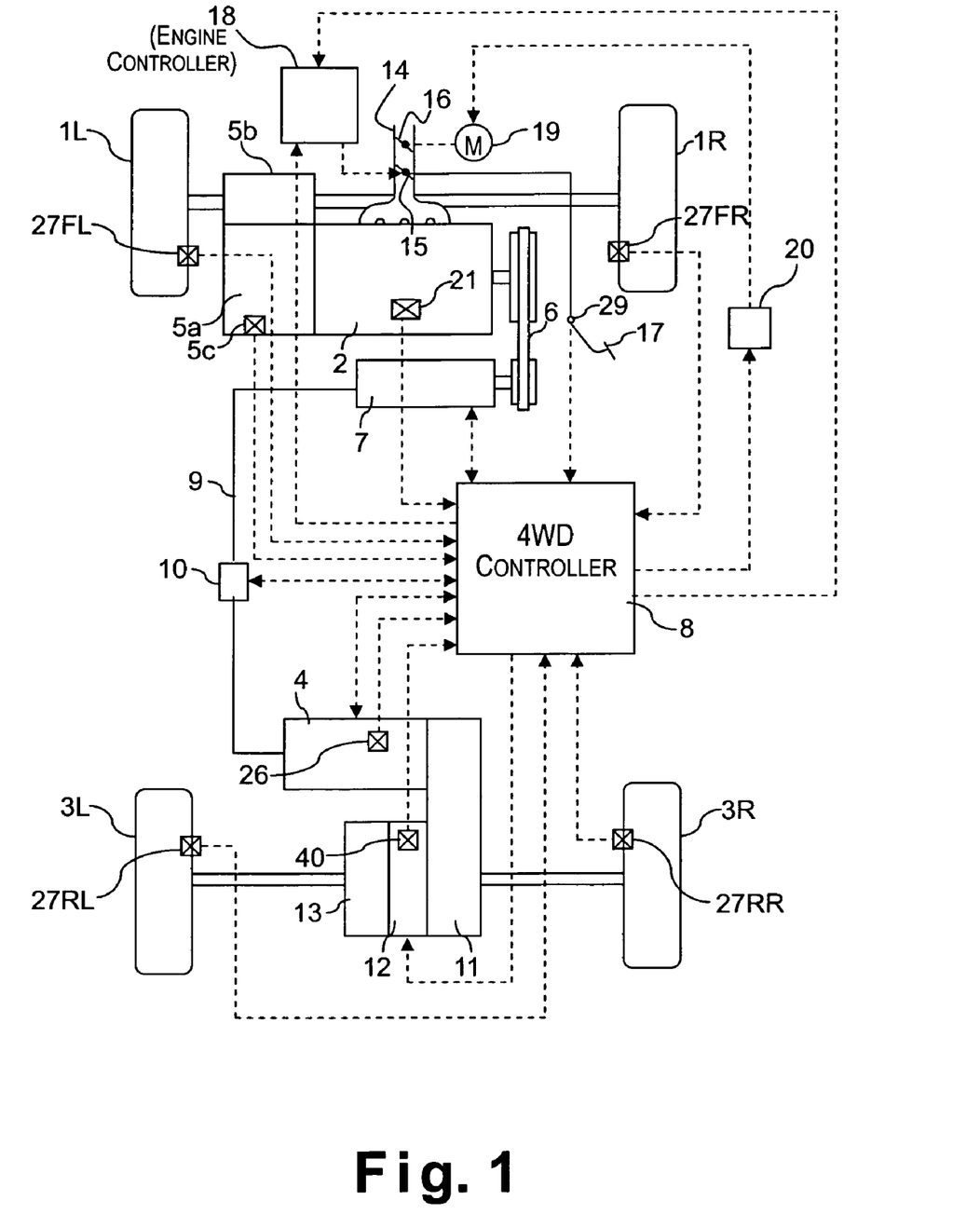
FIG. 1 is a schematic block diagram of a vehicle equipped with a vehicle driving force control apparatus in accordance with preferred embodiments of the present invention.

Referring initially to FIGS. 1–8, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. The output torque Te of the engine 2 is delivered to the left and right front wheels 1L and 1R after passing through a transmission 5a and a differential gear 5b. An endless drive belt 6 transfers power from the internal combustion engine 2 to an electric generator 7, which supplies electrical energy to the electric motor 4. A portion of the output torque Te of the engine 2 is delivered to the electric generator 7 by the endless drive belt 6. In other words, the generator 7 is rotated at a rotational speed Nh, which is obtained by multiplying the rotational speed Ne of the internal combustion engine 2 by the pulley ratio of the endless drive belt 6.

The transmission 5a is provided with a shift or gear position detecting device 5c (gear ratio detecting device) configured to detect the current shift range or gear position of the transmission 5a. The shift position detecting device 5c sends a signal indicating the detected shift position to a 4WD controller 8. The transmission 5a executes gear shifting in response to a shift command from a transmission control unit (not shown in the drawings). The transmission control unit holds tables or the like containing information describing the shift schedule of the transmission based on the vehicle speed and the accelerator position. When it determines that the vehicle will pass through a shift point based on the current vehicle speed and accelerator position, the transmission control unit issues a shift command to the transmission.

The generator 7 rotates at a rotational speed Nh that is equal to the product of the rotational speed Ne of the internal combustion engine 2 and the pulley ratio of the endless drive belt 6. The load (torque) placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

As explained below, a four-wheel drive vehicle in accordance with the present invention is configured such that the electric motor 4 is braked immediately after the clutch or other connecting device 12 disconnects the electric motor 4 from the subordinate drive wheels 3L and 3R, so that co-rotation of the electric motor 4 is prevented and the traveling speed region within which four-wheel drive can be used is expanded.

The internal combustion engine 2 has an air intake passage 14 (e.g., the intake manifold) that includes a main throttle valve 15 and a subordinate throttle valve 16. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle detecting device or sensor. Thus, the phrase "accelerator position opening degree" as used herein refers to either a throttle opening amount of the main throttle valve 15 or a depression amount of the accelerator pedal 17 or similar accelerator device.

The subordinate throttle valve 16 uses a stepper motor 19 as an actuator for adjusting its throttle opening. Specifically, the throttle opening of the subordinate throttle valve 16 is adjusted/controlled by the rotational angle of the stepper motor 19, which corresponds to the step count. The rotational angle of the stepper motor 19 is adjusted/controlled by a drive signal from the motor controller 20. The subordinate throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the subordinate throttle valve 16 so as to be smaller than the throttle opening of the main throttle valve 15.

The vehicle driving force control apparatus is also equipped with an engine rotational speed sensor 21 that detects the rotational speed Ne of the internal combustion engine 2. The engine rotational speed sensor 21 outputs control signals that are indicative of the engine rotational speed Ne to both the engine controller 18 and the 4WD controller 8.

Figure 2:
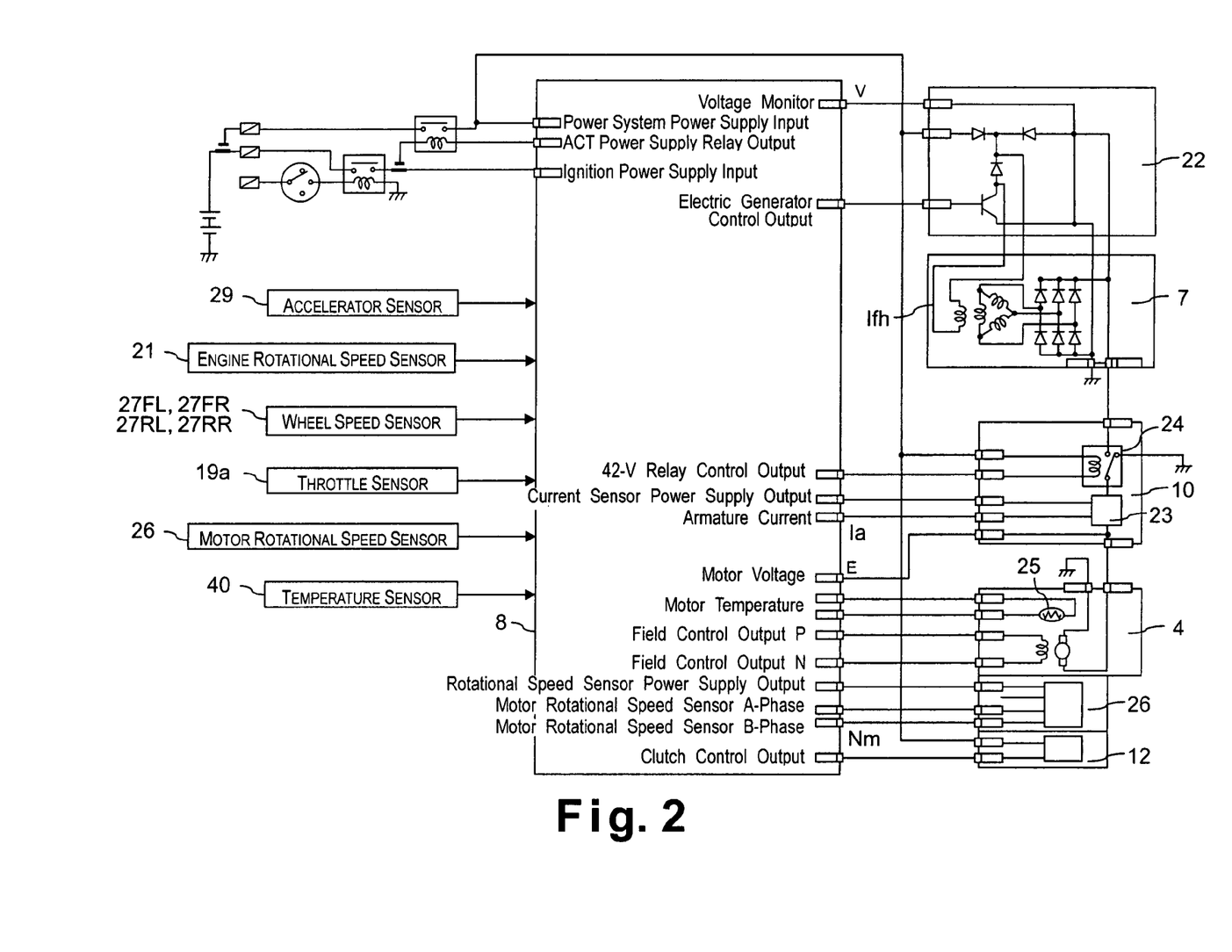
FIG. 2 is a block diagram showing a control system configuration for the vehicle driving force control apparatus illustrated in FIG. 1 in accordance with the illustrated embodiments of the present invention.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value c1 (duty ratio or field current value). In other words, for example, based on the generator control command value c1 (duty ratio) issued from the 4WD controller 8, the voltage regulator 22 controls the field current Ifh of the electric generator 7 and thereby controls the generator load torque Th imposed on the engine 2 by the generator 7 and the output voltage V generated by the generator 7. In short, the voltage adjuster 22 receives the generator control command value c1 (duty ratio or field current value) from the 4WD controller 8 and adjusts the field current Ifh of the generator 7 to a value corresponding to the generator control command value c1. The voltage adjuster 22 is also configured and arranged to detect the output voltage V of the generator 7 and then output the detected voltage value to the 4WD controller 8. This arrangement constitutes the generator output voltage regulating section. Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8. The relay is configured such that when it is OFF the armature of the motor 4 is grounded, i.e., short circuited.

A control command from the 4WD controller 8 controls the field current Ifm of the electric motor 4 to adjust the drive torque of the electric motor 4 to a target motor torque Tm. In other words, the adjustment of the field current Ifm by the 4WD controller 8 adjusts the drive torque Tm of the electric motor 4 to the target motor torque. A thermistor 25 measures the brush temperature of the electric motor 4 and produces a control signal indicative of the temperature of the electric motor 4 that is outputted to the 4WD controller 8.

The vehicle driving force control apparatus is also equipped with a motor rotational speed device or sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is a wet friction clutch, such as a hydraulic clutch, and is configured to fasten (connect) and release (disconnect) in accordance with commands issued from the 4WD controller 8. A temperature sensor 40 is installed inside the clutch 12 and serves as an operating fluid temperature detecting device for detecting the temperature of the operating fluid inside the clutch 12.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

Figure 3:
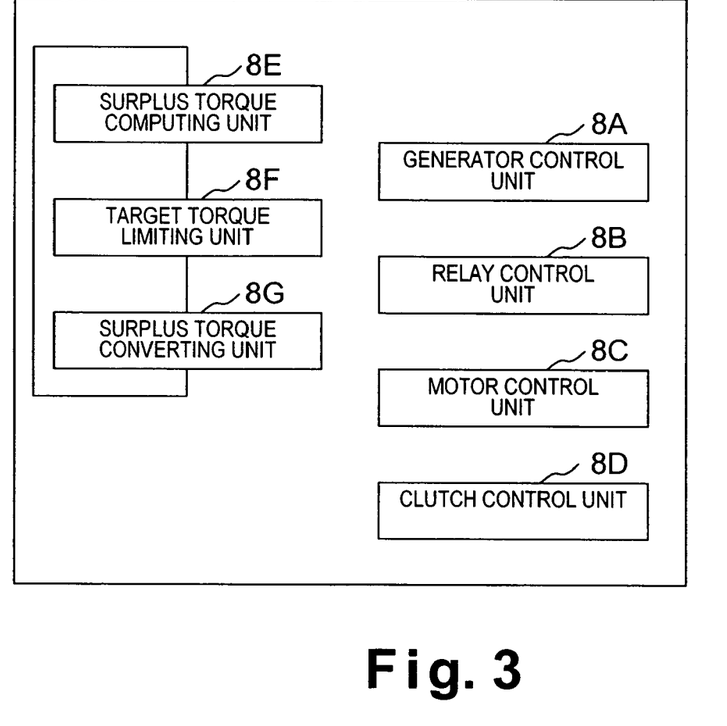
FIG. 3 is a block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control unit or section 8A, a relay control unit or section 8B, a motor control unit or section 8C, a clutch control unit or section 8D, a surplus torque computing unit or section 8E, a target torque limiting unit or section 8F, a surplus torque converting unit or section 8G and a four-wheel drive termination processing unit or section 8H.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

The generator control section 8A uses the voltage regulator 22 to monitor the output voltage of the electric generator 7. Thus, the generator control section 8A is configured to output the generator control command value c1 of the generator 7 to adjust the field current Ifh in accordance with the generator command value c1. In other words, the generator control section 8A adjusts the field current Ifh of the electric generator 7 in such a manner as to obtain a prescribed output voltage V.

The relay control section 8B controls (connection and disconnection) shutting off and connecting the electric power supplied from the generator 7 to the electric motor 4. In short, it functions to switch the motor 4 between a driven state and a non-driven state.

The monitor control section 8C adjusts the torque of the electric motor 4 to the required prescribed value by adjusting the field current Ifm of the electric motor 4.

The clutch control section 8D controls the state of the clutch 12 by outputting a clutch control command to the clutch 12. In other words, the clutch control section 8D operates the clutch 12 to an engaged (connected) state when the vehicle is determined to be in a four-wheel drive mode.

Figure 4:
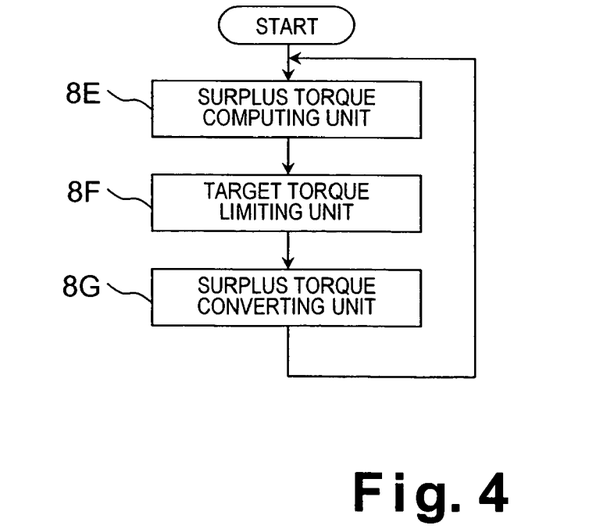
FIG. 4 is a flow chart showing the processing sequence (the surplus load computing section, the target torque limiting section, and the surplus torque converting section) executed by the 4WD controller for the vehicle driving force control apparatus illustrated in FIGS. 1–3 of the illustrated embodiment of the present invention.

Based on the various input signals, the surplus torque computing section 8E, the target torque limiting section 8F, and the surplus torque converting section 8G execute their respective processing sequences in series (i.e., first 8E, then 8F, then 8G, back to 8E, etc.) in accordance with a prescribed sampling time, as shown in FIG. 4.

Figure 5:
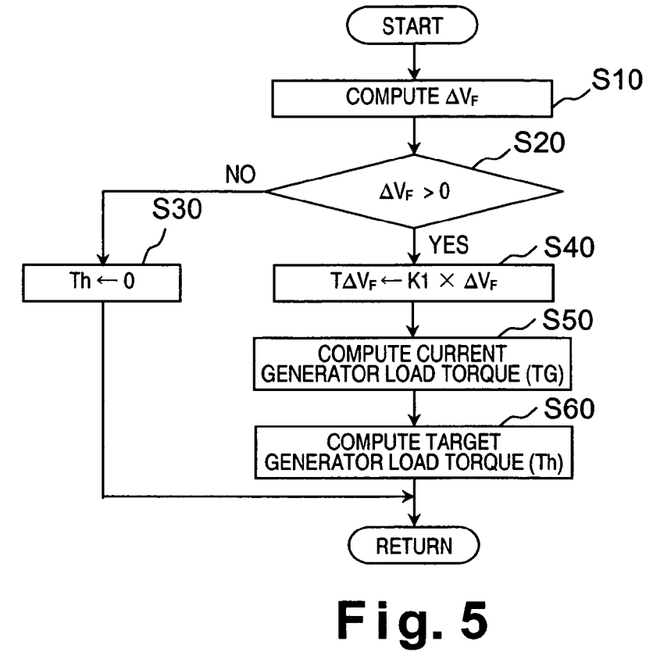
FIG. 5 is a flow chart showing the processing sequence executed by the surplus torque computing section of the 4WD controller for the vehicle driving force control apparatus illustrated in FIG. 1 in accordance with the illustrated embodiments of the present invention.

The processing sequence executed by the surplus torque computing section 8E will now be described with reference to FIG. 5.

First, in step S10, the surplus torque computing section 8E computes the slippage speed or velocity $\Delta V_F$, which is the magnitude of the acceleration slippage of the front wheels 1L and 1R. In particular, the average wheel speeds are computed based on the signals from the wheel speed sensors 27FL, 27FR, 27RL and 27RR. The surplus torque computing section 8E subtracts the average wheel speed of the rear wheels 3L and 3R (subordinate drive wheels) from the wheel speed of the front wheels 1L and 1R (main drive wheels) to find the slippage speed or velocity $\Delta V_F$.

An example of how the slippage velocity $\Delta V_F$ can be computed will now be presented.

First, the average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \qquad (1)$$

$$V_{Wr}=(V_{Wrl}+V_{Wrr})/2 \qquad (2)$$

Second, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, using the following Equation (3):

$$\Delta V_F = V_{Wf} - V_{Wr} \qquad (3)$$

Then, the 4WD controller 8 proceeds to step S20.

In step S20, the surplus torque computing section 8E of the 4WD controller 8 determines whether or not the calculated slippage velocity $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage velocity $\Delta V_F$ is determined to be zero or below, it is estimated that the front wheels 1L and 1R are not experiencing acceleration slippage and the 4WD controller 8 proceeds to step S30, where a target generator load torque Th is set to zero and the surplus torque computing section 8E of the 4WD controller 8 returns to the beginning of the control loop, and the 4WD controller 8 returns to the main program.

Conversely, in step S20 if the slippage velocity $\Delta V_F$ is determined to be larger than zero, then the surplus torque computing section 8E estimates that the front wheels 1L and 1R are experiencing acceleration slippage, and thus, control proceeds to step S40.

In step S40, the surplus torque computing section 8E computes the amount of torque $T\Delta V_F$ that must be absorbed in order to suppress the acceleration slippage of the front wheels 1L and 1R. In other words, the absorption torque $T\Delta V_F$ is an amount that is proportional to the acceleration slippage magnitude. The absorption torque $T\Delta V_F$ is calculated using the following Equation (4):

$$T\Delta V_F = K1 \times \Delta V_F \qquad (4)$$

where: K1 is a gain that is found through experimentation or the like.

Then, the surplus torque computing section 8E of the 4WD controller 8 proceeds to step S50.

In step S50, a current load torque TG of the generator 7 is calculated by the surplus torque computing section 8E based on the Equation (5) below, and then the surplus torque computing section 8E proceeds to step S60.

$$TG = K2 \frac{V \times Ia}{K3 \times Nh} \qquad (5)$$

where: V: voltage of the generator 7,
Ia: armature current of the generator 7,
Nh: rotational speed of the generator 7,
K3: efficiency, and
K2: coefficient.

In step S60, the surplus torque computing section 8E computes surplus torque, i.e., the target generator load torque Th to be imposed by the electric generator 7. For example, the target generator load torque Th is found based on the Equation (6) stated below, and the 4WD controller 8 returns to the beginning of the control loop.

$$Th = TG + T\Delta V_F \qquad (6)$$

Figure 6:
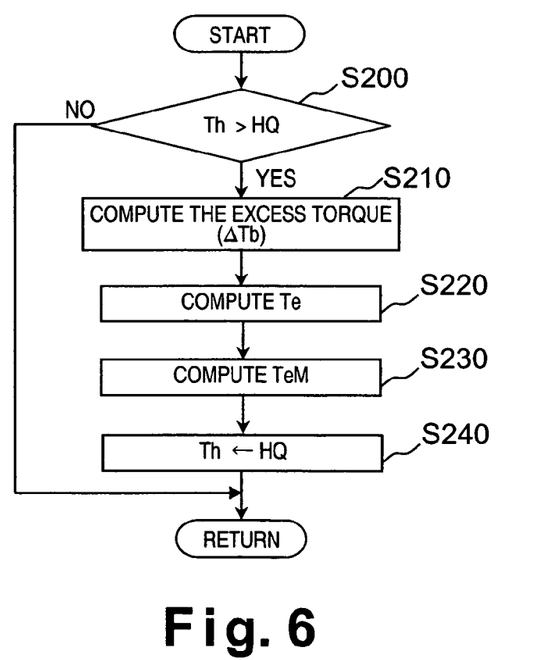
FIG. 6 is a flow chart showing the processing sequence executed by the target torque control (limiting) section of the 4WD controller for the vehicle driving force control apparatus illustrated in FIG. 1 in accordance with the illustrated embodiments of the present invention.

Next, the processing executed by the target torque (control) limiting section 8F will be explained based on FIG. 6. The processing of the target generator load torque Th in the flow chart of FIG. 6 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S200, the target torque limiting section 8F of the 4WD controller 8 determines whether or not the target generator load torque Th is larger than the maximum load capacity HQ of the generator 7. The target torque limiting section 8F proceeds to the beginning of the control program to repeat the processing if the target torque limiting section 8F determines that target generator load torque Th is less than or equal to the maximum load capacity HQ of the generator 7. Conversely, the target torque limiting section 8F proceeds to step S210 if the 4WD controller 8 determines that the target generator load torque Th is larger than the maximum load capacity HQ of the generator 7.

In step S210, the target torque limiting section 8F calculates the excess torque $\Delta Tb$, which is the amount by which the target generator load torque Th exceeds the maximum load torque HQ. The excess torque $\Delta Tb$ can be calculated according to the following Equation (7):

$$\Delta Tb = Th - HQ. \qquad (7)$$

Then, the target torque limiting section 8F proceeds to step S220.

In step S220, the target torque limiting section 8F calculates the current engine torque Te. For example, the current engine torque Te is computed based on the signals from the throttle sensor 19a and the engine rotational speed sensor 21 using an engine torque calculation map. Then, the 4WD controller 8 proceeds to step S230.

In step S230, the target torque limiting section 8F computes the engine torque upper limit value TeM. The engine torque upper limit value TeM is calculated by subtracting the excess torque $\Delta Tb$ from the engine torque Te, as set forth in the following Equation (8):

$$TeM = Te - \Delta Tb. \qquad (8)$$

After the engine torque upper limit value TeM is outputted to the engine controller 18, the target torque limiting section 8F proceeds to step S240.

Here, the engine controller 18 limits the engine toque Te in such a manner that the engine torque upper limit value TeM received from the target torque limiting section 8F becomes the upper limit value of the engine torque Te irregardless of operation of the accelerator pedal 17 by the driver.

In step S240, the target torque limiting section 8F substitutes the maximum load capacity HQ as the target generator load torque Th and the 4WD controller 8 returns to the main program.

In step S240, the target torque limiting section 8F substitutes the maximum load capacity HQ as the target generator load torque Th. In other words, the maximum load capacity HQ is assigned as the target generation load torque Th, and then the target torque limiting section 8F returns to the beginning of the control loop and the 4WD controller 8 returns to the main program.

Figure 7:
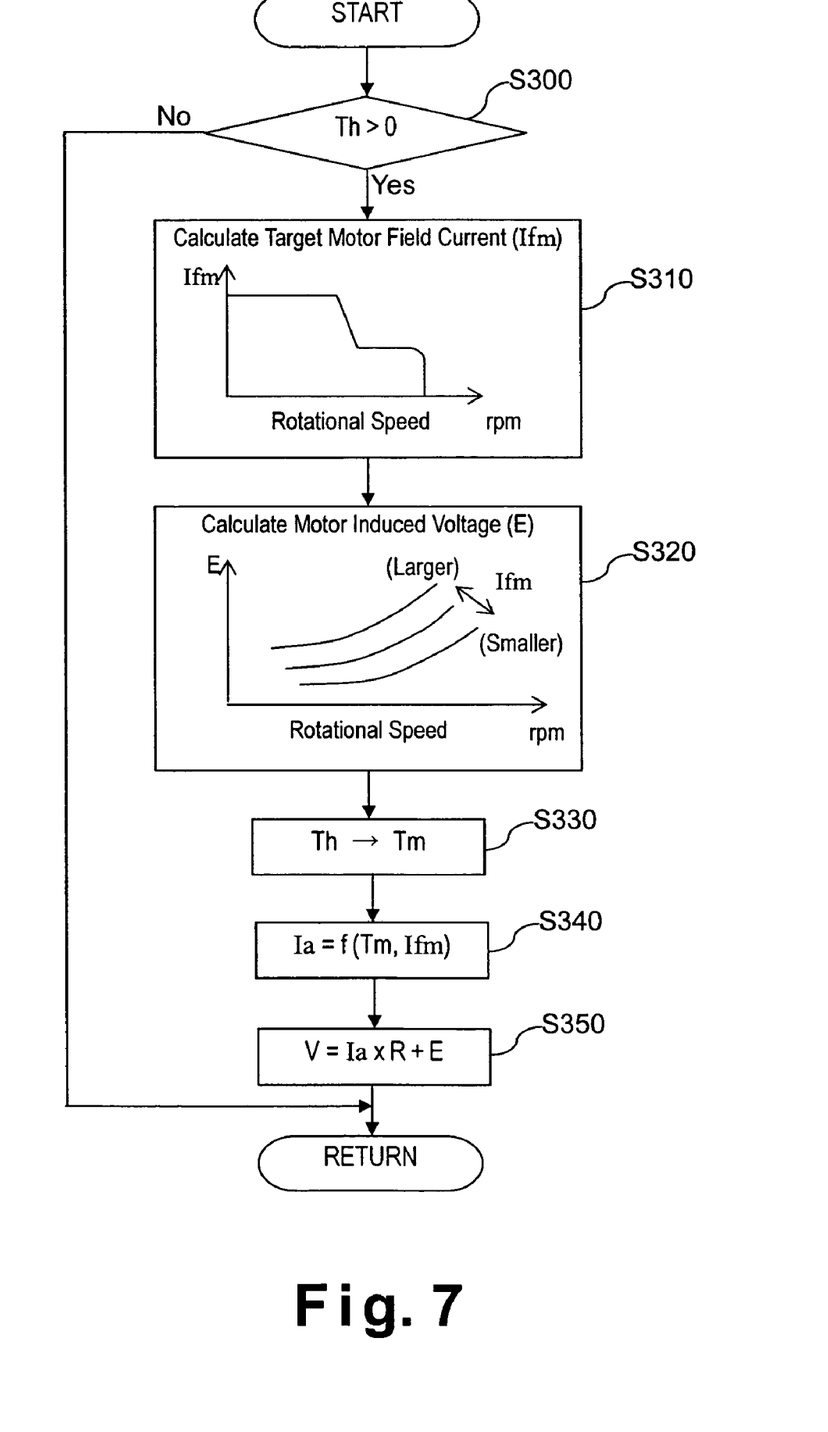
FIG. 7 is a flowchart showing the processing executed by the surplus torque converting section in accordance with the first embodiment of the present invention.

Next, the processing executed by the surplus torque converting section 8G will be explained based on FIG. 7.

First, in step S300, the surplus torque converting section 8G of the 4WD controller 8 determines if the target generator load torque Th is larger than 0. If the target generator load torque Th is determined to be larger than 0, then the program of the surplus torque converting section 8G proceeds to step S310 because the front wheels 1L and 1R are experiencing acceleration slippage. If the surplus torque converting section 8G determines that the target generator load torque Th is less than or equal to 0, then the surplus torque converting section 8G returns to the beginning of the control loop because the front wheels 1L and 1R are not experiencing acceleration slippage or the traveling speed of the vehicle is such that the motor 4 will rotate at a rotational speed exceeding the maximum tolerable rotational speed of the motor 4 and the 4WD controller 8 returns to the main program without executing further steps of the surplus torque converting section 8G. Thus, the vehicle remains in a two-wheel drive mode.

In step S310, the surplus torque converting section 8G reads in the rotational speed Nm of the electric motor 4 detected by the motor rotational speed sensor 26. The target motor field current Ifmt corresponding to the rotational speed Nm of the electric motor 4 is calculated. Then the surplus torque converting section 8G sends the calculated target motor field current Ifmt to the motor control section 8C before the surplus torque converting section 8G proceeds to step S320.

The target motor field current Ifmt is held at a fixed current value with respect to the rotational speed Nm of the electric motor 4 so long as the rotational speed Nm is less than a prescribed rotational speed. When the rotational speed Nm exceeds the prescribed rotational speed, the field current Ifm of the electric motor 4 is reduced using a well-known weak field control method. More specifically, when the rotational speed of the electric motor 4 becomes high, the motor induced voltage E increases and the motor torque declines. Thus, when the rotational speed Nm of the electric motor 4 exceeds a prescribed value, the field current Ifmt of the electric motor 4 is reduced in order to reduce the induced voltage E and thereby increase the current flowing to the motor 4 in order to obtain a prescribed motor torque Tm. As a result, even if the rotational speed of the electric motor 4 becomes high, the prescribed torque Tm can be obtained because the induced voltage E is kept from increasing so that the motor torque is kept from declining. Since the motor field current Ifmt is controlled in two stages, i.e., one field current is used for rotational speeds below a prescribed rotational speed and another field current is used for rotational speeds equal to or above a prescribed rotational speed, the cost of the electronic circuitry can be reduced in comparison with a case in which the field current is controlled on a continuous basis.

It is also acceptable to provide a motor torque correcting device that corrects the motor torque Tm on a continuous basis by adjusting the field current Ifmt in accordance with the rotational speed Nm of the electric motor 4. In other words, it is acceptable to adjust the field current Ifmt of the electric motor 4 on a continuous basis in accordance with the motor rotational speed Nm instead of on a two-stage basis. Here again, even if the rotational speed of the electric motor 4 becomes high, the required motor torque Tm can be obtained because the induced voltage E of the electric motor 4 is kept from increasing so that the motor torque is kept from declining. This approach provides a smooth motor torque characteristic and thereby enables the vehicle to travel in a more stable manner than in the case of two-stage control and the motor to be driven in an efficient state at all times.

In step S320, the surplus torque converting section 8G calculates the induced voltage E of the motor 4 based on the target motor field current Ifm and the motor rotational speed Nm and proceeds to step S330.

In step S330, the surplus torque converting section 8G calculates the target motor torque Tm corresponding to the generator load torque Th computed by the surplus torque computing section 8E.

In step S340, the surplus torque converting section 8G calculates the target armature current Ia corresponding to the target motor torque Tm and the target motor field current Ifm and proceeds to step S350.

In step S350, the surplus torque converting section 8G calculates the target voltage V of the electric generator 7 based on the target armature current Ia, the resistance R, and the induced voltage E using the following Equation (9):

$$V = Ia \times R + E. \tag{9}$$

The resistance R is the electrical resistance of the electrical wire 9 and the coil of the motor 4.

The surplus torque converting section 8G then sends the calculated target voltage V of the electric generator 7 to the generator control section 8A and the 4WD controller 8 returns to the main program.

Although in this embodiment the surplus torque converting section 8G takes the control of the motor 4 into consideration when it calculates the target voltage V of the electric generator 7 required to obtain the target generator load torque Th, it is also acceptable to calculate target voltage value V directly from the target generator load torque Th.

The processing sequence executed by the clutch control section 8D will now be described with reference to FIG. 8.

In step S410, the clutch control section D determines if the target generator load torque Th is larger than 0. If the target generator load torque Th is larger than 0, then the clutch control section D determines that the front wheels 1L and 1R are slipping, i.e., the conditions for four-wheel drive are satisfied, and proceeds to step S420. Meanwhile, if the target generator load torque Th is 0 or below, the clutch control section D determines that the front wheels 1L and 1R are not slipping, i.e., the vehicle is in a two-wheel drive state, and proceeds to step S450.

After the vehicle starts moving from a stop in four-wheel drive mode, the timing at which the front wheels 1L and 1R cease to undergo acceleration slippage, i.e., the timing at which the target generator load torque Th becomes 0, differs depending on such factors as the coefficient of friction μ of the road surface and the accelerator position. More specifically, if the coefficient of friction μ of the road surface is large, acceleration slippage of the front wheels 1L and 1R will only occur in a region of low vehicle traveling speeds. Similarly, it is also difficult for acceleration slippage to occur when the amount of accelerator pedal depression is small. Thus, the timing at which the vehicle shifts from four-wheel drive to two-wheel drive differs depending on the traveling state of the vehicle. More specifically, the traveling speed or motor rotational speed at which the vehicle shifts from four-wheel drive to two-wheel drive differs depending on the traveling state of the vehicle.

In step S420, the clutch control section 8D determines if the condition for disconnecting the clutch is satisfied. If so, the clutch control section D proceeds to step S450. If not, the clutch control section D proceeds to step S430. The determination as to whether or not the clutch disconnect condition is satisfied is made by determining if the current motor rotational speed Nm is less than a reference speed VC corresponding to such a vehicle speed value as 30 km/h. If the current motor rotational speed Nm is larger than the reference speed VC, then the clutch control section 8D determines that the clutch disconnect condition is satisfied. In this embodiment, the clutch disconnect condition is based not on the actual vehicle traveling speed but on whether the motor rotational speed Nm is larger than a reference speed VC. In other words, the motor rotational speed Nm is used to estimate the current traveling speed and the estimated speed is compared to a prescribed reference speed. The traveling speed corresponding to the reference speed VC is the reference traveling speed value and is obtained by multiplying the reference speed VC by the appropriate gear ratios. Needless to say, it is also acceptable to determine if the actual traveling speed is larger than a reference traveling speed value.

In step S430, the clutch control section 8D issues the clutch ON command and proceeds to step S440.

In step S440, the clutch control section 8D feeds the relay ON command to the relay control section 8B in order to put the vehicle into four-wheel drive and the 4WD controller 8 returns to the main program.

Meanwhile, in step S450, the clutch control section issues the clutch OFF command and proceeds to step S460.

In step S460, the clutch control section 8D feeds the relay OFF command to the relay control section 8B in order to short circuit the motor armature 29 and proceeds to step S470.

In step S470, the clutch control section 8D determines if the motor rotational speed Nm is 0. If the motor rotational speed Nm is 0, the clutch control section 8D proceeds to step S480.

In step S480, the clutch control section 8D issues the motor braking command to the motor control section 8C, thereby braking the motor 4 by setting the motor field current Ifm to 0. Thus, step S480 constitutes a motor braking device. The 4WD controller then returns to the main program.

The operational effects of a four-wheel drive vehicle configured as described heretofore will now be described.

When the torque transmitted to the front wheels 1L and 1R from the engine 2 exceeds the road surface reaction force torque limit, i.e., when the front wheels 1L and 1R (main drive wheels 1L and 1R) undergo acceleration slippage, due to the coefficient of friction µ of the road surface being small or the accelerator pedal 17 being depressed deeply by the driver, the electric generator 7 is operated with a load torque Th corresponding to the magnitude of the acceleration slippage so that the drive torque transmitted to the front wheels 1L and 1R is adjusted to a value in the vicinity of the road surface reaction force torque limit of the front wheels 1L and 1R. As a result, the acceleration slippage of the front wheels 1L, 1R (main drive wheels 1L and 1R) is suppressed.

Additionally, the acceleration performance of the vehicle is improved because the surplus electric power generated by the electric generator 7 is used to drive the electric motor 4, which in turn drives the subordinate drive wheels, i.e., the rear wheels 3L and 3R (four-wheel drive).

Also, since the electric motor 4 is driven using the surplus torque in excess of the road surface reaction torque limit of the main drive wheels 1L and 1R, the energy efficiency and fuel economy of the vehicle are also improved.

If the rear wheels 3L and 3R are always driven, several energy conversions will take place (from mechanical energy to electrical energy and again from electrical energy to mechanical energy), creating energy losses corresponding to the conversion efficiencies. As a result, the acceleration performance of the vehicle will decline in comparison with a case in which only the front wheels 1L and 1R are driven. Thus, it is generally preferable to avoid driving of the rear wheels 3L and 3R. Conversely, this embodiment takes into consideration the fact that when traveling on a slippery road surface or the like, even if all the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R and the acceleration performance is improved.

After the vehicle enters four-wheel drive, the clutch 12 is released and the vehicle is returned to two-wheel drive when the traveling speed of the vehicle reaches or exceeds a prescribed reference traveling speed value, i.e., when the motor rotational speed Nm reaches or exceeds a prescribed reference speed VC. The release of the clutch protects the motor 4 by preventing the motor 4 from reaching a rotational speed that exceeds its maximum tolerable rotational speed. In this embodiment, when the clutch 12 is released, the relay 24 is turned OFF and the armature of the motor 4 is short circuited, which causes a braking force to act on the motor 4. Additionally, after this braking force causes the rotational speed Nm of the motor 4 to decrease to 0, another braking force is applied to the motor 4 by dropping the field current Ifm supplied to the motor 4 to 0. Thus, even if the clutch 12 is a wet friction type clutch, the motor 4 can be prevented from co-rotating with the rear wheels 3L and 3R and the motor rotational speed Nm that serves as the threshold value for shifting from four-wheel drive to two-wheel drive, i.e., the reference speed VC, can be set to the motor protection limit value. Consequently, the speed region in which four-wheel drive can be used can be expanded. Additionally, since the braking of the motor 4 is accomplished by short circuiting the armature, there is no need for a dedicated braking mechanism and increases in cost can be avoided. Furthermore, since the time required to stop the motor 4 can be reduced, wear of the rectifying brushes can be reduced and the period of time during which rotational vibrations occur due to rotor unbalance can be shortened.

In general, the capacity of the clutch has been limited because the larger the capacity of the clutch is, the larger the co-rotational torque acting on the motor will be. However, with the present invention, a clutch having a large capacity can be used because co-rotation of the motor can be prevented.

Second Embodiment

Figure 9:
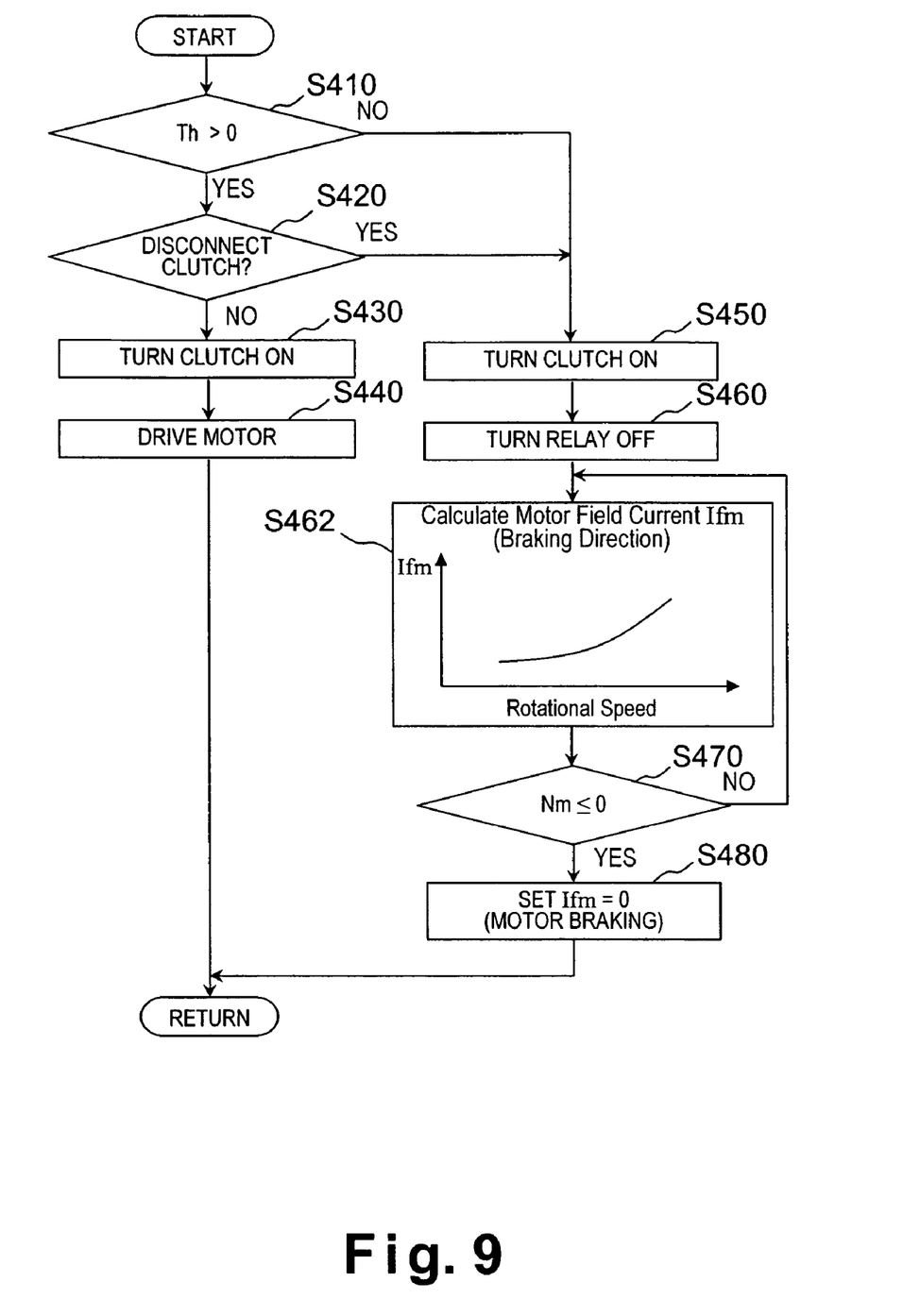
FIG. 9 is a flowchart presenting a second embodiment of the processing executed by the clutch control section shown in FIG. 3.

Referring now to FIG. 9, a vehicle driving force control apparatus in accordance with a second embodiment will now be explained. The configuration of the vehicle used in this second embodiment is the same as the configuration of the vehicle in the first embodiment (see FIG. 1). In view of the similarity between the first and second embodiments, the descriptions of the parts or steps of the second embodiment that are identical to the parts or steps of the first embodiment may be omitted for the sake of brevity. In other words, unless otherwise specified, the rest of the configuration of the vehicle and the processing in the second embodiment are the same as the configuration of the first embodiment.

Figure 8:
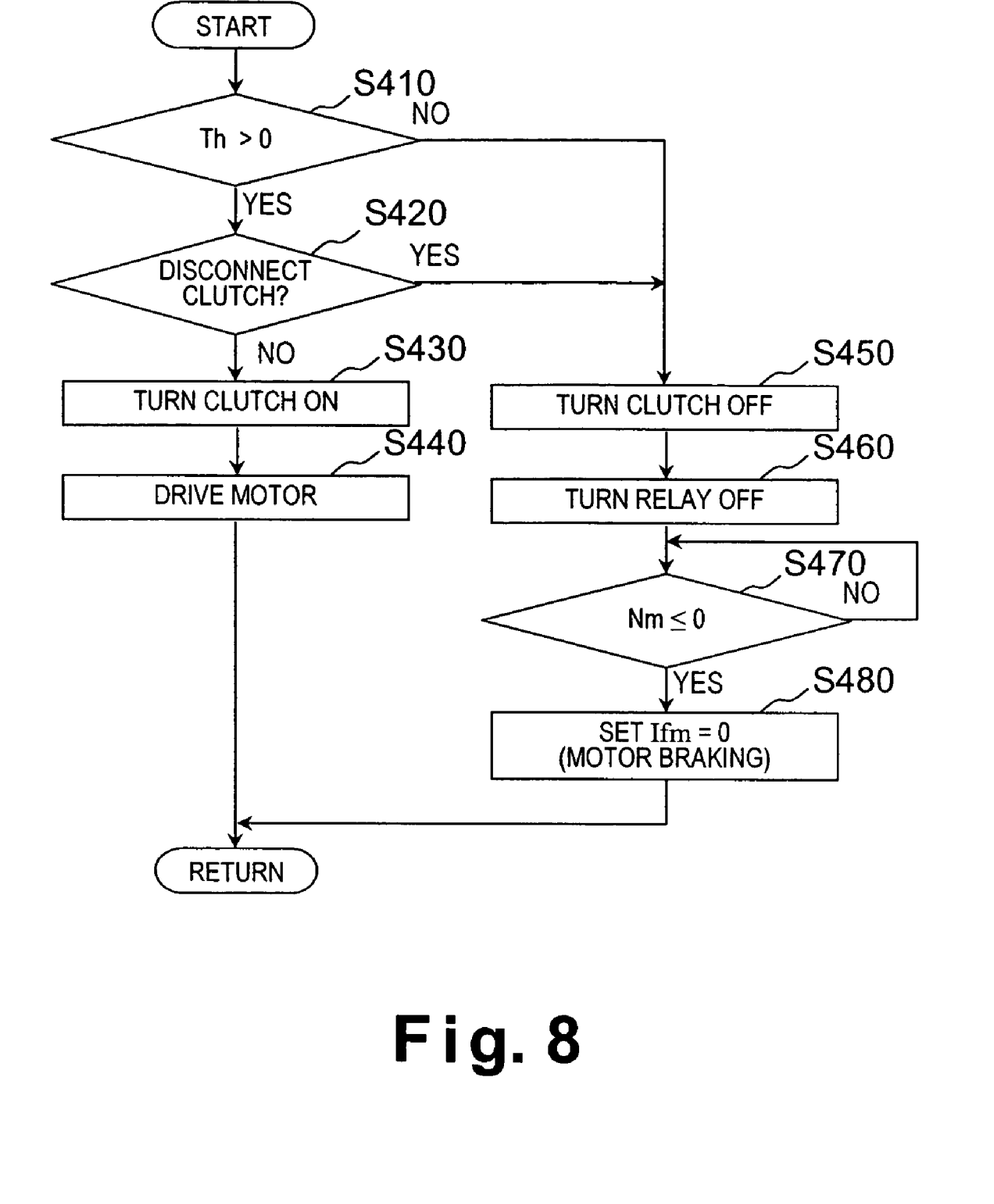
FIG. 8 is a flowchart presenting a first embodiment of the processing executed by the clutch control section shown in FIG. 3.

The flowchart shown in FIG. 9 is an alternative to FIG. 8, which shows the processing of the clutch control section 8D of the first embodiment. The processing of the second embodiment shown in FIG. 9 is similar to the processing of the first embodiment shown in FIG. 8 and many of the steps are identical. Steps that are the same as the third embodiment are indicated with the same reference numerals and explanation thereof is omitted for the sake of brevity. More specifically, FIG. 9 differs from FIG. 8 in that a new step S462 is inserted between steps S460 and S470.

In step S462, the clutch control section 8D calculates the motor field current (braking direction) Ifm based on the motor rotational speed Nm detected by the motor rotational speed sensor 26 at the time of clutch release and proceeds to step S470. The value of the motor field current Ifm is set in such a manner as to be smaller when the motor rotational speed Nm is small and larger when the motor rotational speed is large. In other words, the smaller the motor rotational speed Nm is, the smaller the braking force applied to the motor 4 will be.

In step S470, the clutch control section 8D returns to step S462 if the clutch control section 8D finds that the motor rotational speed is larger than 0.

In short, in a four-wheel drive vehicle in accordance with the second embodiment, the field current of the motor is controlled in accordance with the rotational speed of the motor detected at the time of clutch release in such a manner that the braking force acting on the motor 4 is smaller if the motor rotational speed Nm is smaller and larger if the motor rotational speed Nm is larger. Thus, in addition to the effects of the first embodiment, the second embodiment has the effects of avoiding the occurrence of noise and physical shock and enabling the motor to be stopped in a stable manner.

Third Embodiment

Figure 10:
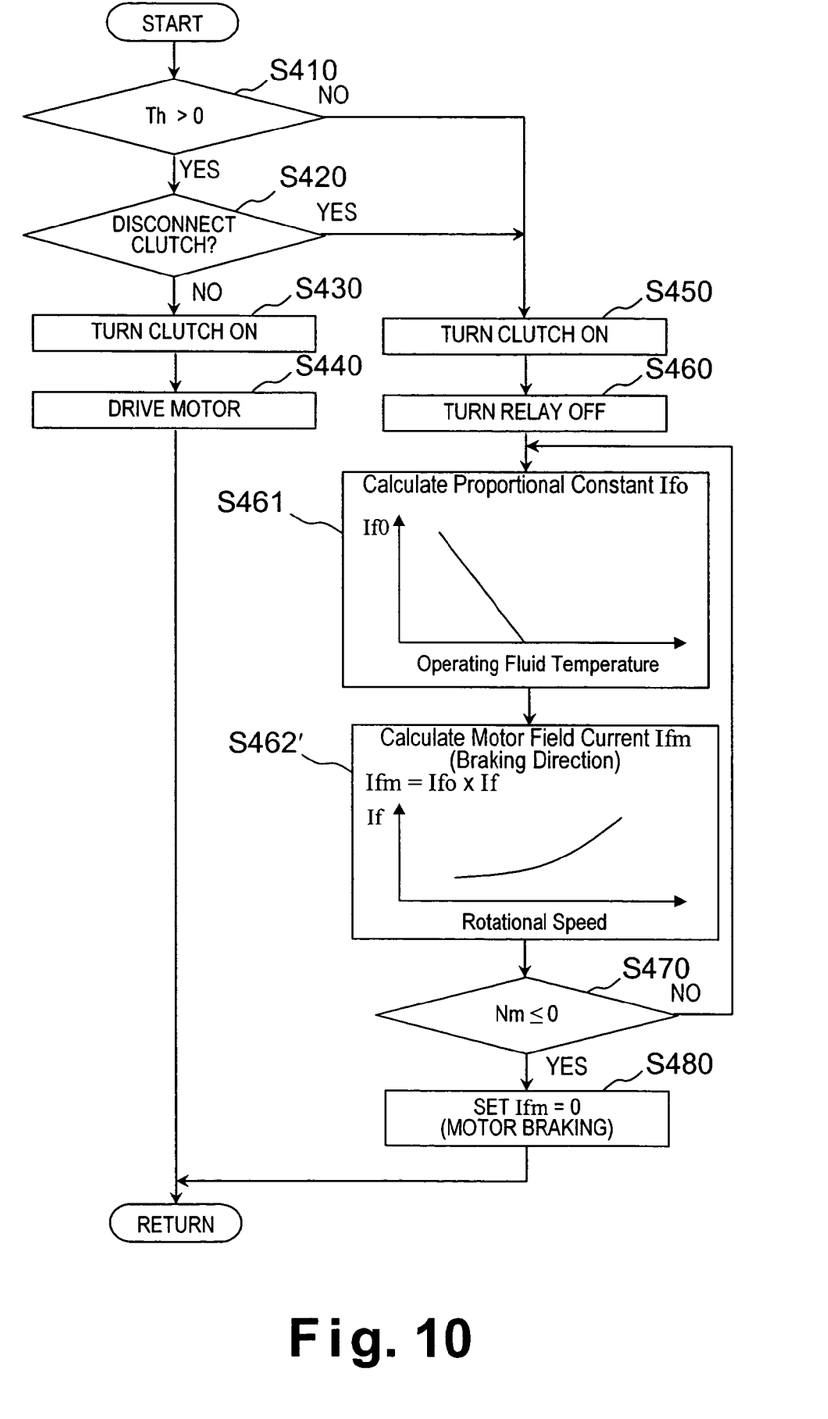
FIG. 10 is a flowchart presenting a third embodiment of the processing executed by the clutch control section shown in FIG. 3.

Referring now to FIG. 10, a vehicle driving force control apparatus in accordance with a third embodiment will now be explained. The configuration of the vehicle used in this third embodiment is the same as the configuration of the vehicle in the first embodiment (see FIG. 1). In view of the similarity between the third and prior embodiments, the descriptions of the parts or steps of the third embodiment that are identical to the parts or steps of the prior embodiments may be omitted for the sake of brevity. In other words, unless otherwise specified, the rest of the configuration of the vehicle and the processing in the third embodiment are the same as the configuration of the prior embodiments.

The flowchart shown in FIG. 10 is an alternative to FIG. 9, which shows the processing of the clutch control section 8D of the second embodiment. The processing of the third embodiment shown in FIG. 10 is similar to the processing of the second embodiment shown in FIG. 9 and many of the steps are identical. Steps that are the same as the third embodiment are indicated with the same reference numerals and explanation thereof is omitted for the sake of brevity. More specifically, FIG. 10 differs from FIG. 9 in that a new step S461 is inserted between steps S460 and S462 and step S462 is modified into step S462'.

In step S461, the clutch control section 8D calculates a field current proportional constant If0 based on the temperature of the clutch operating fluid detected by the temperature sensor 40 at the time of clutch release and proceeds to step S462'. The proportional constant If0 is calculated in such a manner that the smaller the temperature of the operating fluid is, larger the value of the proportional constant If0 is set. Similarly to the motor field current set in step S462 of the previous embodiment, the motor field current Ifm set in step S462' is set for the purpose of braking the motor 4. Therefore, the motor field current Ifm is set such that the braking force applied to the motor 4 becomes larger as the proportional constant If0 becomes larger, i.e., as the temperature of the operating fluid becomes lower.

Similarly to step S462, in step S462' the clutch control section 8D calculates a reference motor field current If based on the motor rotational speed Nm detected by the motor rotational speed sensor 26 at the time of clutch release and then calculates the motor field current (braking direction) Ifm by multiplying the reference motor field current If by proportional constant If0 calculated in step S461. The clutch control section 8D then proceeds to step S470. The value of the reference motor field current If is set in such a manner as to be smaller when the motor rotational speed Nm is small and larger when the motor rotational speed is large. In other words, the smaller the motor rotational speed Nm is, the smaller the braking force applied to the motor 4 will be.

In step S470, the clutch control section 8D returns to step S462' if the clutch control section 8D finds that the motor rotational speed is larger than 0.

In short, in a four-wheel drive vehicle in accordance with the third embodiment, the field current of the motor is controlled in accordance with the temperature of the operating fluid detected at the time of clutch release (i.e., connecting device release) in such a manner that the braking force acting on the motor 4 is larger if the temperature of the clutch operating fluid is low and smaller if the temperature of the operating fluid is high. Thus, in addition to the effects of the second embodiment, the third embodiment has the effect of reliably preventing rotation of the motor caused by co-rotational torque, which increases as the temperature of the operating fluid decreases and the viscosity of the operating fluid increases.

Fourth Embodiment

Figure 11:
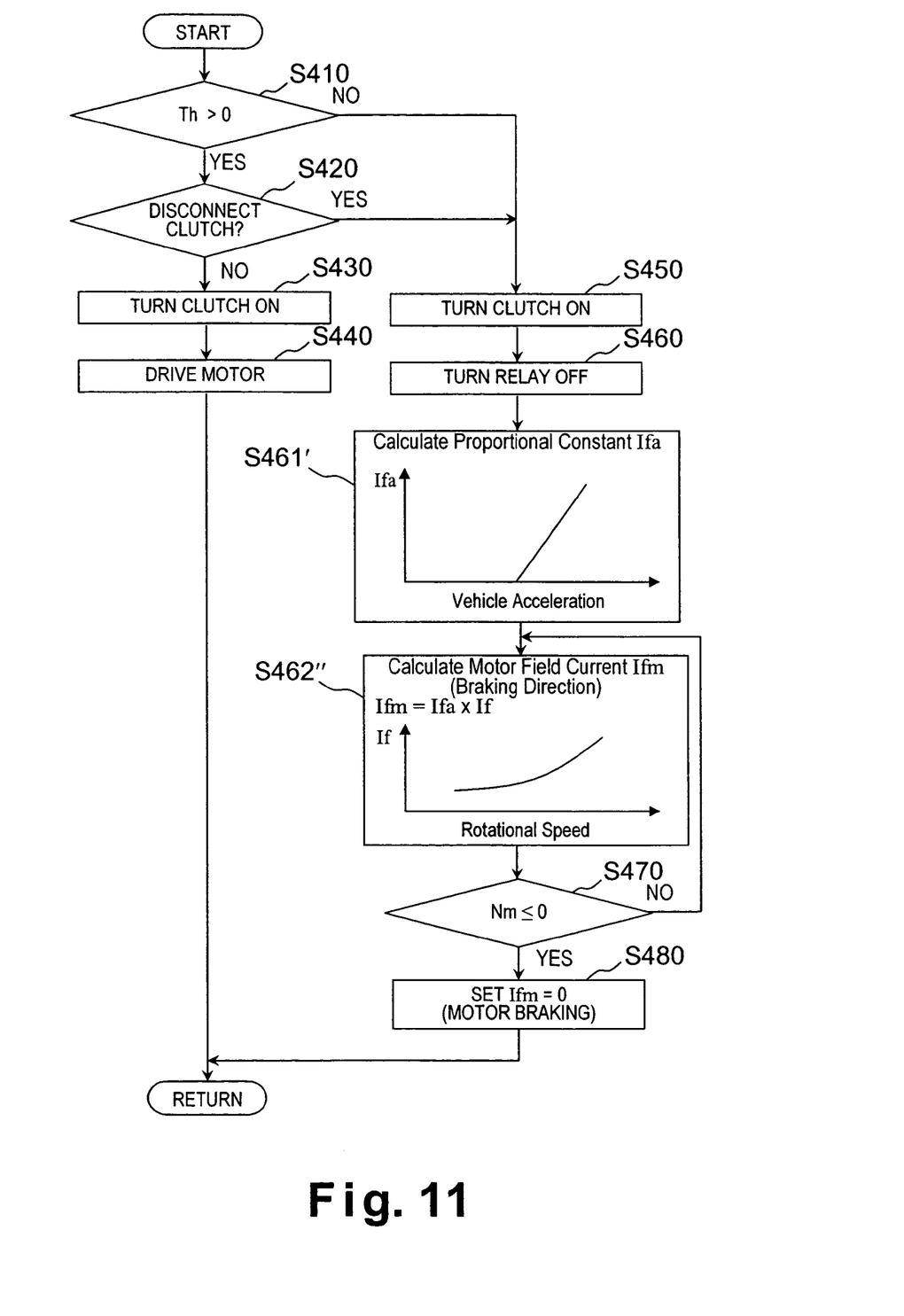
FIG. 11 is a flowchart presenting a fourth embodiment of the processing executed by the clutch control section shown in FIG. 3.

Referring now to FIG. 11, a vehicle driving force control apparatus in accordance with a fourth embodiment will now be explained. The configuration of the vehicle used in this fourth embodiment is the same as the configuration of the vehicle in the first embodiment (see FIG. 1). In view of the similarity between the fourth and prior embodiments, the descriptions of the parts or steps of the fourth embodiment that are identical to the parts or steps of the prior embodiments may be omitted for the sake of brevity. In other words, unless otherwise specified, the rest of the configuration of the vehicle and the processing in the fourth embodiment are the same as the configuration of the prior embodiments.

A fourth embodiment of a four-wheel drive vehicle in accordance with the present invention will now be explained using the flowchart shown in FIG. 11. The flowchart shown in FIG. 11 is an alternative to FIG. 10, which shows the processing of the clutch control section 8D of the third embodiment. The processing of the fourth embodiment shown in FIG. 11 is similar to the processing of the third embodiment shown in FIG. 10 and many of the steps are identical. Steps that are the same as the third embodiment are indicated with the same reference numerals and explanation thereof is omitted for the sake of brevity. More specifically, FIG. 11 differs from FIG. 10 in step S461 has been modified into step S461' and step S462' has been modified into step S462".

In step S461', the clutch control section 8D calculates the acceleration of the vehicle at the time of clutch release by differentiating the rotational speed of the rear wheels 3L and 3R (subordinate drive wheels) and then calculates a field current proportional constant Ifa based on the calculated vehicle acceleration. The value of the proportional constant Ifa is set in such a manner as to be larger when the vehicle acceleration is larger and smaller when the vehicle acceleration is smaller. Similarly to the motor field current set in step S462' of the previous embodiment, the motor field current Ifm set in step S462" is set for the purpose of braking the motor 4. Therefore, the motor field current Ifm is set such that the braking force applied to the motor 4 becomes larger as the proportional constant Ifa becomes larger, i.e., as the vehicle acceleration becomes larger.

In step S462", similarly to step S461' of the previous embodiment, the clutch control section 8D calculates a reference motor field current If based on the motor rotational speed Nm detected by the motor rotational speed sensor 26 at the time of clutch release and then calculates the motor field current (braking direction) Ifm by multiplying the reference motor field current If by proportional constant Ifa calculated in step S461'. The clutch control section 8D then proceeds to step S470. The value of the reference motor field current If is set in such a manner as to be smaller when the motor rotational speed Nm is small and larger when the motor rotational speed is large. In other words, the smaller the motor rotational speed Nm is, the smaller the braking force applied to the motor 4 will be.

In step S470, the clutch control section 8D returns to step S462" if it finds that the motor rotational speed is larger than 0.

In short, in a four-wheel drive vehicle in accordance with the fourth embodiment, the field current of the motor is controlled in accordance with vehicle acceleration at the time of clutch release in such a manner that the braking force applied to the motor 4 is larger if the vehicle acceleration is larger and smaller if the vehicle acceleration is smaller. Thus, in addition to the effects of the second embodiment, the fourth embodiment has the effect of reliably preventing rotation of the motor caused by co-rotational torque, which increases as the vehicle acceleration increases.

Although the embodiments presented heretofore describe situations in which the motor is a direct current motor, the present invention can also be applied to cases in which an alternating current motor is used. An inverter is generally used when an alternating current motor is used and the armature of the alternating current motor can be short circuited by, for example, turning ON the upper arms of all phases of the inverter or turning ON the lower arms of all phases of the inverter.

Although the embodiments presented heretofore describe situations in which the four-wheel drive is achieved by driving an electric motor 4 with electric power generated by an electric generator 7, the present invention is not limited to such an arrangement. It is also acceptable to drive the motor 4 with a separate battery. In such a case, the electric power generated by the electric generator 7 should be consumed by feeding it to a load device other than the motor 4.

Although the embodiments presented heretofore describe situations in which the engine output is limited by means of throttle control, the present invention is not limited to such an approach. It is also acceptable to control the drive force by such methods as retarding the ignition timing of the engine, cutting ignition, and reducing or stopping the delivery of fuel to the engine.

Although the embodiments presented heretofore use a microcomputer to execute the various computerized control operations, it is also acceptable to use any combination of appropriate functional units that can accomplish the same control processing.

Although the embodiments presented heretofore use a wet friction clutch as the connecting device, it is also acceptable to use, for example, a pump type clutch or an electromagnetic power clutch as described in Japanese Laid-Open Patent Publication No. 10-213158.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-369452. The entire disclosure of Japanese Patent Application No. 2003-369452 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive force control apparatus comprising:
a main drive source arranged and configured to drive a main drive wheel;
an electric motor arranged and configured to drive a subordinate drive wheel;
a connecting device installed in a torque transfer path between the electric motor and the subordinate drive wheel, the connecting device being configured and arranged to selectively connect and disconnect the electric motor to and from the subordinate drive wheel; and
a braking device arranged and configured to stop rotation of the electric motor after the electric motor is disconnected from the subordinate drive wheel by the connecting device and while the electric motor remains disconnected from the subordinate drive wheel.

2. The vehicle drive force control apparatus as recited in claim 1, wherein the braking device is configured to stop rotation of the electric motor by short circuiting an armature coil of the electric motor.

3. The vehicle drive force control apparatus as recited in claim 1, wherein
the braking device is further configured to control a field current of the electric motor based on a rotational speed of the electric motor detected by a rotational speed detecting device when the connecting device disconnects the electric motor from the subordinate drive wheel.

4. The vehicle drive force control apparatus as recited in claim 2, wherein
the braking device is further configured to control a field current of the electric motor based on a temperature of an operating fluid within the connecting device as detected by a fluid temperature detecting device when the connecting device disconnected the electric motor from the subordinate drive wheel.

5. The vehicle drive force control apparatus as recited in claim 2, wherein
the braking device is further configured to control a field current of the electric motor based on an acceleration of the vehicle detected by an acceleration detecting device when the connecting device disconnected the electric motor from the subordinate drive wheel.

6. The vehicle drive force control apparatus as recited in claim 2, wherein
the braking device is further configured to control a field current of the electric motor based on a temperature of an operating fluid within the connecting device as detected by a fluid temperature detecting device and a rotational speed of the electric motor detected by a rotational speed detecting device when the connecting device disconnected the electric motor from the subordinate drive wheel.

7. The vehicle drive force control apparatus as recited in claim 2 wherein,
the braking device is further configured to control a field current of the electric motor based on an acceleration of the vehicle detected by an acceleration detecting device and a rotational speed of the electric motor detected by a rotational speed detecting device when the connecting device disconnects the electric motor from the subordinate drive wheel.

8. The vehicle driving force control apparatus as recited in claim 1, further comprising
an electric generator configured and arranged to be driven by the main drive source.

9. The vehicle driving force control apparatus as recited in claim 1, wherein
the main drive source is an internal combustion engine.

10. The vehicle driving force control apparatus as recited in claim 1, wherein
the main drive source is further configured to drive a pair of the main drive wheels and the electric motor is further configured to drive a pair of the subordinate drive wheels.

11. A vehicle drive force control apparatus comprising:
main drive means for rotating a main drive wheel;
electric motor means for rotating a subordinate drive wheel;
connecting means for selectively connecting and disconnecting the electric motor to and from the subordinate drive wheel; and
braking means for stopping rotation of the electric motor means after the electric motor means is disconnected from the subordinate drive wheel by the connecting means and while the electric motor remains disconnected from the subordinate drive wheel.

12. A method of controlling a vehicle drive force control apparatus comprising:
supplying a rotational drive force for rotating a main drive wheel;
supply electric power to an electric motor for rotating a subordinate drive wheel;
selectively connecting and disconnecting the electric motor to and from the subordinate drive wheel; and
stopping rotation of the electric motor after the electric motor is disconnected from the subordinate drive wheel and while the electric motor remains disconnected from the subordinate drive wheel.

* * * * *